United States Patent
Brandt, Jr.

(10) Patent No.: US 6,814,108 B1
(45) Date of Patent: Nov. 9, 2004

(54) PRECISION FILLING APPARATUS

(76) Inventor: Robert O. Brandt, Jr., 541 Wayne Dr., Wilmington, NC (US) 28403

(*) Notice: Subject to any disclaimer, the term of this patent is extended or adjusted under 35 U.S.C. 154(b) by 0 days.

(21) Appl. No.: 10/767,104

(22) Filed: Jan. 29, 2004

(51) Int. Cl.[7] ................................................ B65B 1/04
(52) U.S. Cl. ........................... 141/83; 141/94; 141/153; 141/167
(58) Field of Search ........................... 141/83, 94, 129, 141/144, 145, 153, 167

(56) References Cited

U.S. PATENT DOCUMENTS

| | | | | |
|---|---|---|---|---|
| 4,821,782 A | * | 4/1989 | Hyer | 141/83 |
| 6,220,312 B1 | * | 4/2001 | Hirsch et al. | 141/83 |
| 6,360,787 B1 | * | 3/2002 | Williamson | 141/74 |

* cited by examiner

Primary Examiner—Steven O. Douglas
(74) Attorney, Agent, or Firm—MacCord Mason PLLC

(57) ABSTRACT

Receptacles are precisely filled with particulate material by feeding the material from a supply source across a deflectable, curved weigh pan and discharging a continuous flow of material from the weigh pan along a pathway. Receptacles, which may be the final containers or intermediate receptacles, are continually fed by a conveyor into the pathway so that material flows into each receptacle opening. The amount of material flowing along the pathway is measured by deflection of the pan, and the speed of the receptacle conveyor is quickly adjusted responsive to the deflection of the pan, thereby controlling the time that a given receptacle is within the pathway and the precise amount of material placed into the receptacle. The amount of material flowing to the pan from the supply source can also be controlled responsive to the pan deflection.

20 Claims, 2 Drawing Sheets

PRECISION FILLING APPARATUS

BACKGROUND OF THE INVENTION (1) Field of the Invention

The present invention relates generally to an apparatus for filling receptacles with precise amounts of particulate material from a continuous stream of such material moving along a pathway, and in particular to an apparatus for controlling the speed at which the receptacles are fed into the pathway responsive to the measured amount of material being fed along the pathway.

(2) Description of the Prior Art

Numerous solid particulate materials are packaged in various types of containers for sale to the ultimate consumer or to a downstream processor. A brief exemplary listing of such materials include plastic and metal components and parts; food items, such as cereals, corn meal, rice, spices, soybeans, and potato chips; and a variety of other materials, such as tobacco, plastic pellets, etc. Exemplary containers include boxes, containers, pouches, packages, cartons, and bags.

Generally, the material is fed as a continuous or discontinuous feed from a bulk supply source, such as a hopper, directly into the containers or into intermediate collection hoppers for transfer into the containers. The apparatus used to transfer the material from the supply source into the individual receptacles, the term being used herein to encompass both the final containers and intermediate hoppers or other temporary material holders, may vary dependent upon the type of material, but will normally include a means for weighing the material at some point between the supply source and the receptacle or within the actual receptacle, with some feed-back being provided to control the feed rate, and thereby the amount of material being fed into a given receptacle during a given time period. Control of the feed rate is used not only for material packaged by weight, but also for items packaged by the number of items, since these latter items are frequently packaged on the basis of the weight of the number of items in a container, as opposed to counting the number of items packaged.

In some types of apparatus used to discharge material into a plurality of receptacles, a continuous stream of the material is fed from a bulk supply source, such as a bulk hopper onto a weigh conveyor, and then discharged from the conveyor along a first pathway into a first receptacle. The weight of material conveyed into the first receptacle is measured, either by weighing the amount of material being conveyed, or the weight of the receptacle. When the desired weight is reached, the material stream is directed into a second receptacle. In many instances, a weigh conveyor is used to measure the weight of material being carried on the conveyor during a given time, thereby indicating the weight of material fed to the receptacle.

For production efficiency, some materials are fed continuously at a high rate of feed, with up to the order of 600 containers per minute being filled. Unfortunately, existing filling systems do not measure the material with a high degree of accuracy, particularly at these higher feed volumes. As a result, the amount of material in different receptacles may be more or less than the target amount. Normally, manufacturers overfill containers by an amount sufficient to ensure that the stated weight is met, with a corresponding increase in manufacturing cost. Therefore, there is a continuing need for an apparatus for accurately dispensing solid particulate material from a bulk supply source into a plurality of receptacles, either the final containers or intermediate receptacles, based on the weight of the material being dispensed.

SUMMARY OF THE INVENTION

The present invention addresses this need by providing an improved apparatus for continuously and accurately weighing a continuous stream of solid particulate material, and rapidly adjusting the speed at which receptacles are conveyed into the stream. Generally, the present invention is comprised of a dynamic measurement device to continually measure the weight of material being fed along a pathway, a receptacle conveyor to carry consecutive receptacles into the pathway for filling, and control circuitry to rapidly adjust the speed of the receptacle conveyor in response to measurements by the measurement device. The apparatus may also include means to control the rate at which material is fed to the measuring device responsive to weight or material flow measurements.

Particularly suitable dynamic measurement devices are described in earlier U.S. Pat. Nos. 5,219,031, issued Jun. 15, 1993, and U.S. Pat. No. 5,230,251, issued Jul. 27, 1993, to the present inventor, both patents being incorporated herein by reference in their entireties. Generally, the dynamic measurement device is comprised of a curved weigh pan having inlet and outlet ends, and an inwardly curved surface extending between the pan ends. The pan is positioned to receive a continuous stream of solid particulate material tangentially at the inlet end, i.e., the material stream is directed substantially perpendicular to the radius of curvature of the pan at the upper end. As a result, the material flows around the curved surface of the pan without impacting the pan, eliminating errors due to the movement of the pan under impact forces.

The pan is mounted on the distal end of an elongated support arm, with the proximal end of the arm being attached to a suitable support at a distance from the pan. To permit pan displacement, the arm is either flexible or is pivotally attached at its proximal end. When material flows over the inwardly curved pan, an inward centripetal force, and a corresponding outward force, is exerted causing the pan to move outwardly. This outward movement, corresponding to the weight, or change in weight, of the material moving across the pan is measured by the displacement measurement instrument. A displacement measurement instrument, such as a transducer, is positioned to continuously measure the displacement of the pan. Thus, a dynamic measurement device is capable of measuring variations in the amount of material moving along a given pathway without interrupting the flow of material.

Since the outward force exerted against the pan is due entirely to the centripetal force, and is independent of any impact or frictional forces, measurement is highly accurate, and can be measured instantaneously and continually. For optimal measurement independent of non-centripetal force factors, the pivot point of the arm is preferably located so that a line extending from the arm to the pan approximately midway between the pan inlet and outlet ends is perpendicular to the radius of curvature of the pan. In the present apparatus, the dynamic measurement device is positioned to receive material fed tangentially along the inner surface of the pan at its inlet end.

A receptacle conveyor is positioned downstream of the measuring device to carry consecutive receptacles into the pathway of the material discharged from the exit end of the measurement device. Each receptacle is filled with a predetermined amount of falling material as the receptacle moves thorough the pathway. Upon filling of a given receptacle with the desired amount of material, the continually moving conveyor carries the next receptacle into the material pathway.

The amount of material entering a given receptacle is thus dependent on the weight of material moving along the pathway and the length of time that the given receptacle intersects the pathway. Therefore, by continuous determination of the amount of material flowing along the pathway, and knowing the desired target receptacle content, the correct amount of material can be fed into a given container by adjusting the speed of the receptacle conveyor, and thereby the time that a given receptacle is in the pathway.

In order to ensure precise filling of a given receptacle, certain conditions should be met. First, the receptacle conveyor should be positioned downstream of the pan discharge end so that the receptacle fill openings will be proximate to the discharge end of the measurement device, e.g., within about 2 feet, normally within 0.5 to 1.5 feet. If so, the amount measured at a given time will approximate the amount of material entering the receptacle at that time. Second, the speed of the conveyor must be adjustable within a short period of time, e.g., within about 100 ms, and preferably within about 20 ms after receiving a control signal. Generally, a servo will be used to achieve this desired rapid response, although other conveyor adjustment means will be apparent to one skilled in the art.

Generally, a transducer or other continuous displacement measurement instrument is used to measure displacement of the pan. A controller or processor then receives displacement information from the transducer or other displacement measurement instrument, and calculates the weight of material being fed over the pan. A control signal is then sent to the conveyor speed control means, e.g., a servo, resulting in an increase or decrease in conveyor speed, thereby controlling the period of time a given receptacle intersects the pathway ensuring precise filling of the receptacle.

The above receptacle conveyor control mechanism may be used alone or combined with a material feed control mechanism. When combined in this manner, the receptacle conveyor control mechanism is used to provide precise adjustments as described above, while the material feed control mechanism is used to provide relatively slower, greater adjustments in the volume of material being fed across the displacement measurement instrument. Essentially, the feed control mechanism is comprised of a material flow control means that is adjustable to increase or decrease the flow of material, with the flow control means being adjusted in response to a signal received from the controller based on the weight of material flowing past the displacement instrument. The flow control means may be, for example, a feed conveyor drive means, or a valve on a feed hopper.

When used together, the displacement instrument continually measures the weight of material being fed along a material pathway. The measured weight is fed to a controller that calculates the desired speed of the receptacle feed based on the known target weight of material to be placed in the receptacle. The controller then sends a speed adjustment command to the receptacle conveyor drive mechanism to increase or decrease the conveyor speed to maintain the amount of material being fed into a receptacle on target. The controller can also send a control signal to the flow control means, e.g., if the speed at which receptacles are fed into the material pathway varies outside of a desired range of receptacles per minute.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
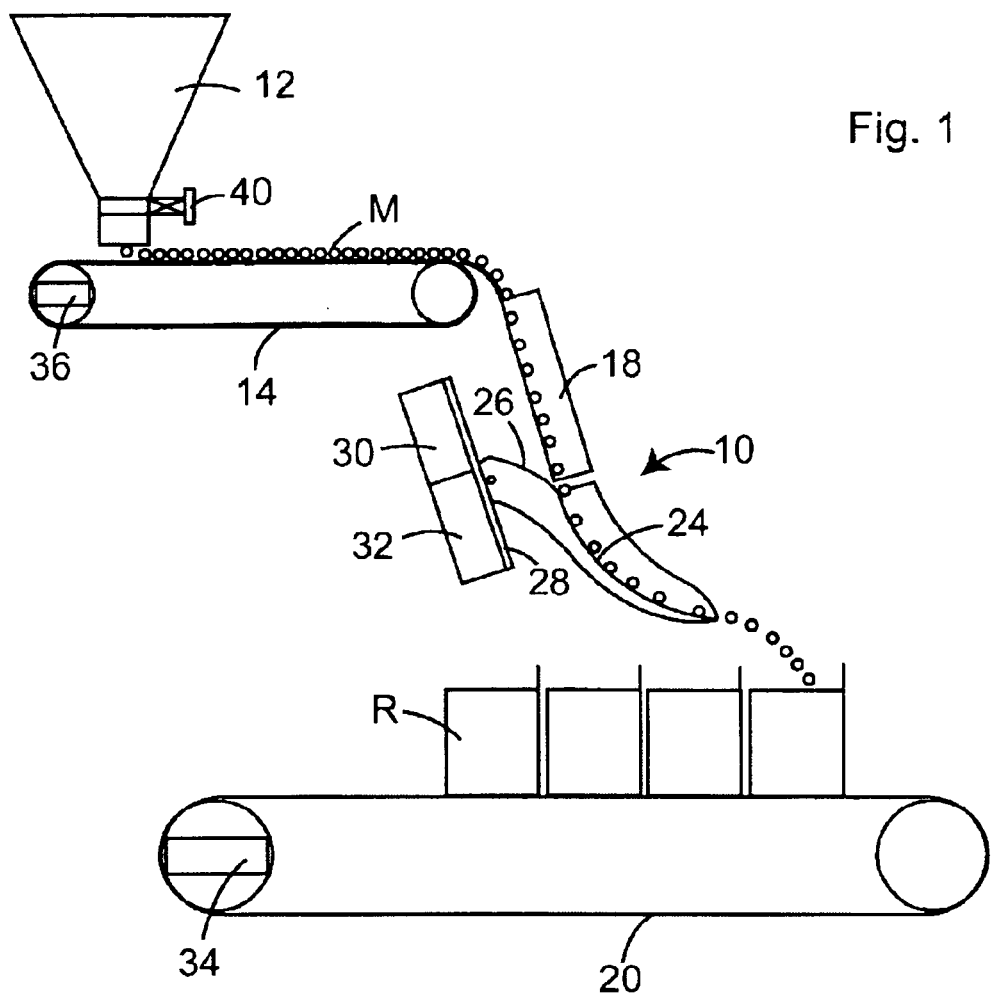
FIG. 1 is a side view of a first embodiment of the present invention.
Figure 2:
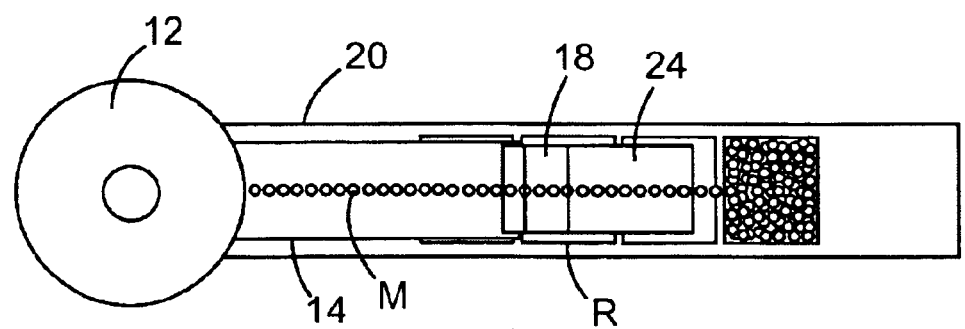
FIG. 2 is a top view of the first embodiment of the present invention.

In the embodiment of the invention shown in FIGS. 1–2, the apparatus of the present invention is comprised of a dynamic measurement device, generally 10, positioned along the pathway of a material M downstream of a material supply source, shown as hopper 12 and variable speed feed conveyor 14. A material guide 18 extends from the discharge end of conveyor 14 to the inlet end of device 10 to guide material M from conveyor 14 to device 10. Device 10 is positioned upstream of variable speed receptacle conveyor 20, positioned to continuously convey a series of receptacles R, in this embodiment the final containers, into the pathway of material M. Pan 24 is positioned relative to receptacle conveyor 20 so that the discharge end of pan 24 is about 24 inches or less, e.g., from about 6 inches to about 18 inches, from the fill opening of receptacles carried on conveyor 20.

Measurement device 10 includes a weigh pan 24 with an upper inlet end, a lower outlet end, and a curved upper surface between the ends; and an arm 26 pivotally joining pan 24 to a support 28. Device 10 further includes a transducer 30 to measure outward movement of pan 24, and controller 32 to receive measurement information from transducer 30 and transmit actuation commands to actuator 34 on receptacle conveyor 20, and optionally to actuator 36 on feed conveyor 14 and/or variable control valve 40 at the discharge end of hopper 12. It will be understood that the locations of transducer 30, controller 32, and actuators 34 and 36 are for illustration only, and that any or all of these elements can be located at different locations so long as they were capable of performing their assigned functions. For example, transducer 30 can be in communication with the lower end of pan 24.

Guide 18 includes a floor having a downwardly curved upper end to facilitate receipt of material, and sidewalls to prevent spillage. Guide 18 can also include a cover, not shown, extending between the top edges of sidewalls. The floor of guide 18 is preferably at an angle of from about 10° to about 30°, e.g., 20°, from vertical, with the upper end curving rearwardly toward horizontal. Pan 24 is aligned so that the radius of curvature of pan 20 is substantially perpendicular to the pan floor at the upper end of pan 24, resulting in tangential entry of material onto the upper surface of pan 24. The upper end of guide 18 is adjacent the discharge end of feed conveyor 14, so that material M is discharged parallel to the surface of pan 24 at its inlet end.

In the operation of the apparatus of FIGS. 1 and 2, material M is fed from feed hopper 12 onto conveyor 14, from which material M is discharged onto guide 18. Material M exiting guide 18 enters pan 24 along the tangent of the radius of curvature of the surface of pan 24 and the inlet end, and then moves across the upper surface of pan 24. Material M is discharged from pan 24 along a pathway. Conveyor 20 continually carries a series of receptacles R, which are final containers as illustrated, into the material M pathway, so that material M flows into each receptacle as the given receptacle intersects the pathway.

In order to precisely fill each receptacle with the desired amount of material M, the linear speed of conveyor 20, and thus the length of time that a given container is within the pathway, is adjusted responsive to the weight of material,M flowing along the pathway. Specifically, transducer 30 continually measures the outward movement of pan 24 under the force of material M. Controller 32 receives measurement information from transducer 32 and transmits a control signal to servo 34, which is capable of quickly adjusting the linear speed of conveyor 20, either up or down, e.g., within about 50 ms.

If the speed of conveyor 20 is consistently above or below a target speed required to fill a given number of receptacles within a given time period, the flow of material M can also be increased or decreased as needed. In this case, controller 32, responsive to values received from transducer 30, can also send a speed adjustment signal to speed controller 36, which can also be a servo, that controls the linear speed of conveyor 14. In addition to, or instead of, adjusting the speed of conveyor 14, controller 32 can send a signal to control the degree of opening of feed hopper valve 40, and thereby the weight of material falling onto conveyor 14. Thus, minor variations in material weight can be accounted for by rapidly adjusting the time that a given receptacle intersects the material pathway, while long-term adjustments to control the number of receptacles filled in a given time period is controlled through adjustment of the feed upstream of the measurement instrument. While control of the upstream feed is adequate for long-term feed volume, rapid adjustments, and thus precise control cannot be achieved in this manner due to the separation of the receptacles from the feed source and short-term flow variations. The downstream control of receptacle speed in accordance with the present invention is required to achieve this precision filling.

Figure 3:
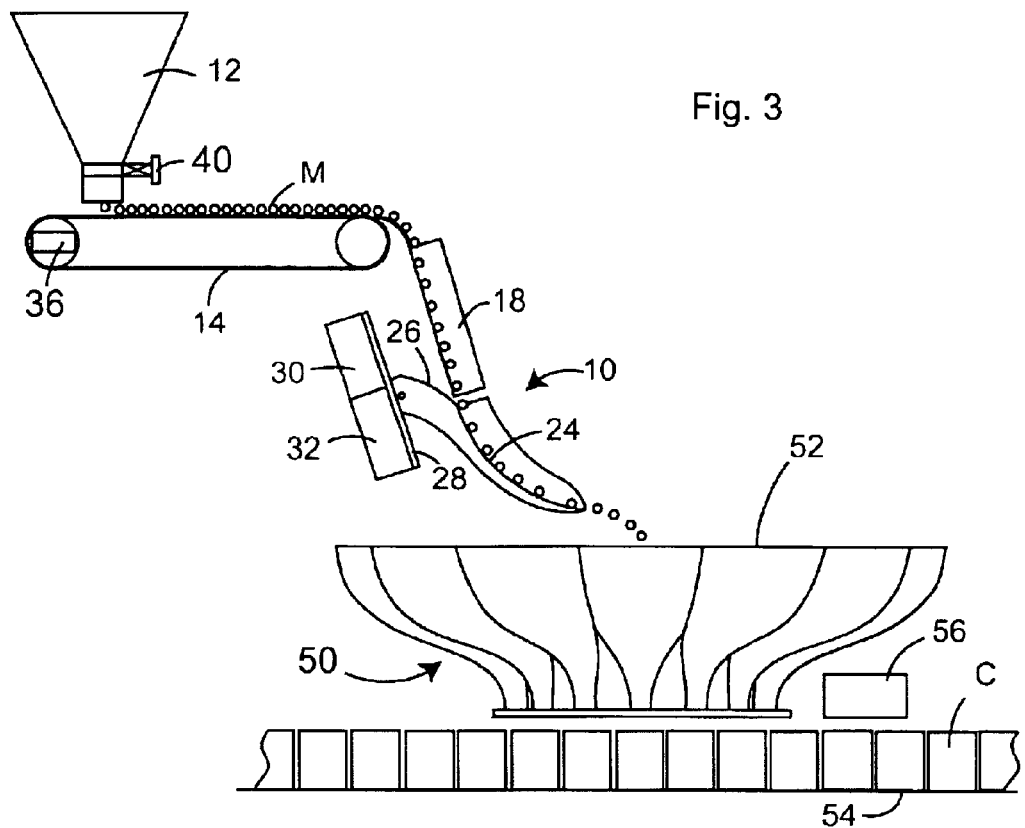
FIG. 3 is a side view of a second embodiment of the present invention.
Figure 4:
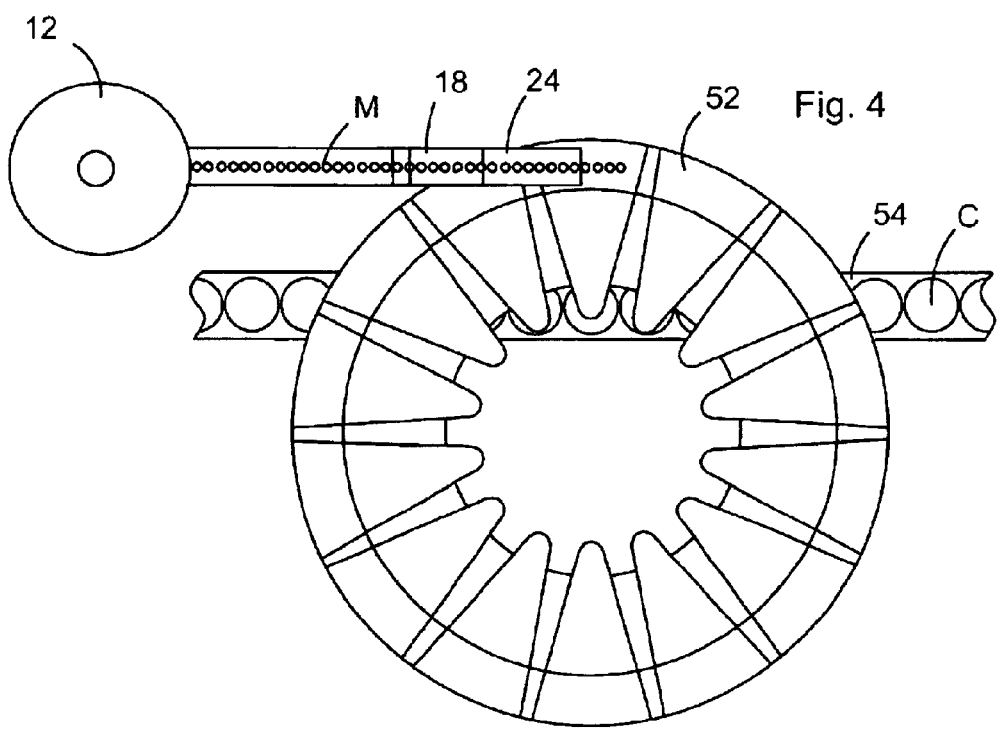
FIG. 4 is a top view of the second embodiment of the present invention.

FIGS. 3 and 4 illustrate a modification of the apparatus of FIGS. 1 and 2 in which conveyor 20 is replaced with circular receptacle conveyor 50. Numbering of the feed and weighing components of the apparatus of FIGS. 3 and 4 is the same as for the apparatus of FIGS. 1 and 2, since these components are the same. Instead of feeding material M directly into final receptacles R as in FIGS. 2 and 3, the apparatus of FIGS. 3 and 4 feeds material M into intermediate hoppers or receptacles 52 which are continually carried in a circular path so that hoppers 52 sequentially intersect the pathway of material M where they are filled with precise quantities of material M.

Conveyor 50 rotates above a container conveyor 54, which carried a series of containers C beneath receptacles 52 to discharge the precise quantities into the containers C. The rotational speed of conveyor 50 is quickly adjusted up or down through control signals from controller 32 to servo 56, which is connected to a drive means, e.g., an electric motor, for conveyor 50. The speed of conveyor 54 is synchronized to the speed of conveyor 50 so that the discharge openings of receptacles 52 will be aligned with containers C. As in the embodiment illustrated in FIGS. 1 and 2, controller 32 can also control the speed of conveyor 20 and/or the degree of opening of valve 40.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An apparatus for feeding precise amounts of material to receptacles comprising:
   a) a deflectable, curved weigh pan for receiving a continuous flow of material and discharging the material along a first pathway;
   b) a variable speed receptacle conveyor for conveying a plurality of material receivers into said first pathway;
   c) a deflection measurement means for continually measuring the deflection of said pan;
   d) a controller to receive deflection measurement information from said measurement means and transmit a control signal indicative of said deflection; and
   e) an actuator to adjust the speed of said receptacle conveyor responsive to a control signal from said controller.

2. The apparatus of claim 1, wherein said pan includes an upper end, a lower end, and a curved surface having a given radius of curvature between said ends, said material being fed onto the inlet end of said pan substantially perpendicular to the radius of curvature of said pan at said inlet end.

3. The apparatus of claim 1, wherein said deflection measurement means is a transducer.

4. The apparatus of claim 1, further including a support arm with a pivotally attached proximal end and a distal end, said pan being supported on the distal end of said arm.

5. The apparatus of claim 1, further including a material feed for feeding material to the inlet end of said pan.

6. The apparatus of claim 1, wherein said material receivers are intermediate hoppers.

7. The apparatus of claim 1, further including a variable speed feed conveyor for feeding material to said weigh pan, the speed of said feed conveyor being controllable by said controller.

8. The apparatus of claim 1, further including a guide plate having an inlet end for receiving said material, and an outlet end adjacent to and substantially in a plane with the inlet end of said pan.

9. An apparatus for feeding precise amounts of material to receptacles comprising:
   a) a deflectable, curved weigh pan having an upper inlet end for receiving a continuous flow of material, a lower outlet end for discharging the material along a first pathway, and an inwardly curved surface having a given radius of curvature between said inlet and outlet ends;
   b) a variable speed receptacle conveyor for conveying a plurality of material receptacles into said first pathway;
   c) a deflection measurement means for continually measuring the deflection of said pan;
   d) a controller to receive deflection measurement information from said measurement means and transmit a control signal indicative of said deflection; and
   e) an actuator to adjust the speed of said receptacle conveyor responsive to receipt of an actuation signal from said controller.

10. The apparatus of claim 9, wherein said deflection measurement means is a transducer.

11. The apparatus of claim 9, further including a support arm with a pivotally attached proximal end and a distal end, said pan being supported on the distal end of said arm.

12. The apparatus of claim 9, further including a material feed for feeding material to the inlet end of said pan substantially perpendicular to the radius of curvature of said pan at said inlet end.

13. The apparatus of claim 9, further including a variable speed feed conveyor for feeding material to said weigh pan, the speed of said second conveyor being controllable by said controller.

14. The apparatus of claim 9, further including a guide plate having an inlet end for receiving said material, and an outlet end adjacent to and substantially in a plane with the inlet end of said pan.

15. An apparatus for packaging precise amounts of solid particulate material comprising:
 a) a solid particulate material feeder having a feeder discharge end;
 b) a deflectable, curved weigh pan having an upper inlet end for receiving a continuous flow of material along said feed pathway, a lower outlet end for discharging the material along a first discharge pathway, and an inwardly curved surface having a given radius of curvature between said inlet and outlet ends, the radius of curvature at said inlet end being substantially perpendicular to said feed pathway;
 c) a variable speed receptacle conveyor for conveying a plurality of material receptacles into said first pathway;
 d) a transducer for continually measuring the deflection of said pan;
 e) a controller to receive deflection measurement information from said transducer and transmit a control signal indicative of said deflection; and
 f) a servo to adjust the speed of said receptacle conveyor responsive to receipt of an actuation signal from said controller.

16. The apparatus of claim 15, wherein said feed pathway is at an angle of from about 10° to about 30° from vertical, and said material is discharged substantially horizontally from said pan outlet.

17. The apparatus of claim 15, wherein said pan is deflected from a pivot point positioned along a line perpendicular to the radius of curvature of said pan approximately midway between said pan inlet and outlet ends.

18. The apparatus of claim 15, wherein said material feeder is a conveyor.

19. The apparatus of claim 15, further including a material feed for feeding material to the inlet end of said pan substantially perpendicular to the radius of curvature of said pan at said inlet end.

20. The apparatus of claim 15, wherein said controller is further adapted to control the feed of said material to said pan.

* * * * *